United States Patent Office 2,816,898
Patented Dec. 17, 1957

2,816,898
ARYL HALOGEN SUBSTITUTED DIOXANES AND DIOXINS AND PROCESSES

Joseph A. Lambrech, Charleston, W. Va., assignor to Union Carbide Corporation, a corporation of New York No Drawing. Application September 30, 1954, Serial No. 459,508

3 Claims. (Cl. 260—340.7)

This invention relates to new chemical compounds and to a method for their manufacture. More particularly, the present invention relates to heterocyclic compounds having the formula:

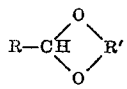

wherein R is hydrogen or an alkyl radical, preferably containing from 1 to 4 carbon atoms, and R' is a divalent aliphatic hydrocarbon chain containing three carbon atoms, the first carbon being linked to a phenyl radical and to a member selected from the class consisting of hydrogen and chlorine, the second carbon being linked to chlorine and to a member selected from the class consisting of hydrogen and chlorine and the third carbon being linked to two hydrogens. Representative examples of this class of compound are: 5,5-dichloro-4-phenyl-1,3-dioxane; 5,5-dichloro-4-phenyl-2-methyl-1,3-dioxane; 5,5-dichloro-4-phenyl-2-ethyl-1,3-dioxane; 5,5-dichloro-4-phenyl-2-propyl-1,3-dioxane; 5,5-dichloro-4-phenyl-2-butyl-1,3-dioxane; 4,5,5-trichloro-4-phenyl-1,3-dioxane; 4,5,5-trichloro-4-phenyl-2-methyl-1,3-dioxane; 4,5,5-trichloro-4-phenyl-2-ethyl-1,3-dioxane; 4,5,5-trichloro-4-phenyl-2-propyl-1,3-dioxane; 4,5,5-trichloro-4-phenyl-2-butyl-1,3-dioxane; 5-chloro-4-phenyl-1,3-dioxin-4; 5-chloro-4-phenyl-2-methyl-1,3-dioxin-4; 5-chloro-4-phenyl-2-ethyl-1,3-dioxin-4; 5-chloro-4-phenyl-2-propyl-1,3-dioxin-4; and 5-chloro-4-phenyl-2-butyl-1-3,-dioxin-4.

The compounds of this invention are useful as paint removers and as solvents, for example for vinyl resins. They can be nitrated and reduced to produce substituted anilines, the diazo compounds of which are useful in the manufacture of pigments and dyes. My compounds are particularly valuable as dye carriers for synthetic fibers, such as polyethylene-terephthalate.

The 5,5-dichloro-4-phenyl-1,3-dioxanes, which can be represented by the formula:

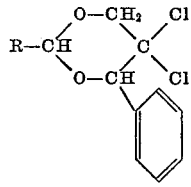

wherein R is a member selected from the class consisting of hydrogen and alkyl radicals, can be prepared by condensing 2,2-dichloro-3-phenyl-1,3-propanediol with an equimolar amount of an aldehyde, for example formaldehyde, acetaldehyde or butyraldehyde, in the presence of from about 1 percent to about 2 percent by weight of the reactants of an acid catalyst. Suitable catalysts are mineral acids, such as sulfuric acid, and organic acids, such as toluenesulfonic acid or methanesulfonic acid. The condensation should be conducted in the presence of a solvent, such as benzene, toluene or xylene, at a temperature sufficient to cause the mixture to boil. Heating is stopped when water is no longer obtained overhead. The acid catalyst is then neutralized for example with sodium acetate, and the neutralized reaction mixture is distilled to yield the desired product. The 2,2-dichloro-3-phenyl-1,3-propanediol used in this reaction can be prepared in accordance with the method described and claimed in my copending application Serial No. 459,507 filed of even date herewith. The condensation reaction can be represented graphically by the following equation:

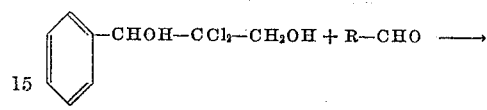

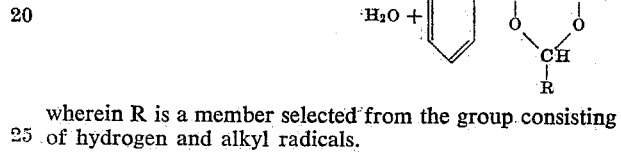

wherein R is a member selected from the group consisting of hydrogen and alkyl radicals.

The novel chlorophenyldioxins of my invention, which can be represented by the following formula:

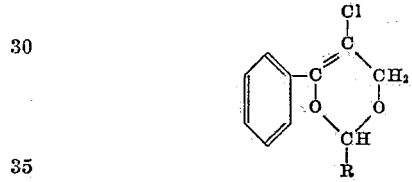

wherein R is a member selected from the group consisting of hydrogen and alkyl radicals, can be prepared by reacting the above-described dichlorophenyldioxanes with about an equimolar amount of potassium hydroxide in the presence of an alcoholic solvent, such as ethanol. The reaction mixture is heated at a temperature of from about 50° C. to about 150° C. and preferably at a temperature of about 80° C. to 90° C. for a period of from about one hour to about ten hours. Water can then be added to the resulting mixture to form an aqueous layer and an organic layer. The organic layer can then be extracted with ethyl ether to recover the desired product. The reaction can be represented graphically by the following equation:

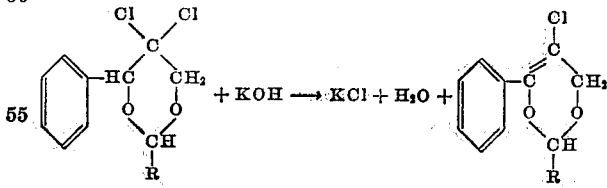

wherein R is a member selected from the class consisting of hydrogen and alkyl radicals.

The trichlorophenyldioxanes of my invention, which can be represented by the following formula:

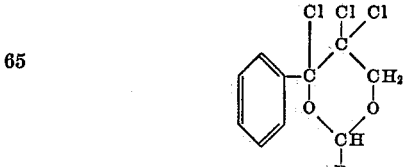

wherein R is a member selected from the class consisting of hydrogen and alkyl radicals, can be prepared by reacting the above-described chlorophenyldioxins with an equimolar amount of chlorine at a temperature of from about 30° C. to about 70° C. and preferably at about 35 to 40° C. The dioxin can be admixed with a solvent, such as carbontetrachloride, and contacted with chlorine gas until the theoretical amount of chlorine has been absorbed. The reaction mixture can then be distilled under reduced pressure to yield the desired product. The chlorination reaction can be represented graphically by the following equation.

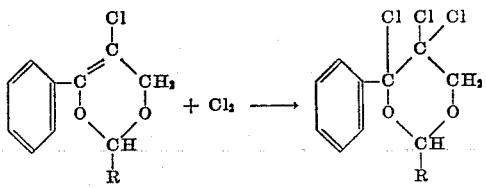

The following examples are illustrative:

Example I 5,5-dichloro-4-phenyl-2-methyl-1,3-dioxane was prepared by adding a mixture of 300 cc. of benzene and 300 grams of acetaldehyde to a mixture of 220 grams of 2,2-dichloro-3-phenyl-1,3-propanediol, 500 cc. of benzene and 5 cc. of concentrated sulfuric acid at the boiling point (70° C. to 85° C.). Heating was continued until water was no longer obtained. The acid catalyst was neutralized with sodium acetate and the product distilled. 5,5-dichloro-4-phenyl-2-methyl-1,3-dioxane boils at 129° C. at 4 mm. Hg and melts at 78° C. It was obtained in a yield of 85 percent.

Example II 5,5-dichloro-4-phenyl-2-propyl-1,3-dioxane was prepared by adding a mixture of 500 cc. of benzene and 72 grams of butyraldehyde to a mixture of 220 grams of 2,2-dichloro-3-phenyl-1,3-propanediol, 500 cc. of benzene and 5 cc. of concentrated sulfuric acid at the boiling point. Heating was continued until water was no longer obtained. The acid catalyst was neutralized with sodium acetate and the product distilled. 5,5-dichloro-4-phenyl-2-propyl-1,3-dioxane boils at 138° C. at 3 mm. Hg and has a specific gravity of 1.220 (20°/20° C.).

Example III 5,5-dichloro-4-phenyl-1,3-dioxane was prepared by adding a mixture of 300 cc. of toluene and 16 grams of paraformaldehyde to a mixture of 110 grams of 2,2-dichloro-3-phenyl-1,3-propanediol, and 5 grams of para-toluene sulfonic acid at the boiling point (100° C. to 110° C.). Heating was continued until water was no longer obtained. The acid catalyst was neutralized with sodium acetate and the product distilled. 5,5-dichloro-4-phenyl-1,3-dioxane is a crystallizing solid which boils at 120° C. at 2.5 mm. Hg and melts at 81° C.

Example IV 5-chloro-4-phenyl-2-methyl-1,3-diox-4-in was prepared by heating a mixture of 74 grams of 5,5-dichloro-4-phenyl-2-methyl-1,3-dioxane, 30 grams of potassium hydroxide and 270 grams of ethanol at the boiling point for ten hours. The reaction mixture was added to 1 liter of water and the organic material extracted with ethyl ether. The product boils at 107° C. at 3 mm. Hg and has a specific gravity of 1.204 (20°/20° C.). The yield was 89 percent.

Example V 5-chloro-4-phenyl-1,3-diox-4-in was prepared by heating a mixture of 57 grams of 5,5-dichloro-4-phenyl-1,3-dioxane, 30 grams of potassium hydroxide and 270 grams of ethanol at the boiling point for ten hours. The reaction mixture was added to 1 liter of water and the organic material extracted with ethyl ether. The product is a slightly colored liquid which boils at 120° C. at 4 mm. Hg and has a specific gravity of 1.264 (20°/20° C.). The yield was 88 percent.

Example VI 4,5,5-trichloro-4-phenyl-1,3-dioxane was prepared by adding chlorine at the rate of 35 grams per hour to a mixture of 70 grams of 5-chloro-4-phenyl-1,3-diox-4-in and 150 cc. of carbon tetrachloride at 35° to 40° C. until the theoretical quantity of chlorine was absorbed. The reaction product was distilled under reduced pressure. 4,5,5-trichloro-4-phenyl-1,3-dioxane boils at 120° C. at 2 mm. Hg and melts at 36° C. It was obtained in a yield of 90 percent.

Example VII 4,5,5-trichloro-4-phenyl-2-methyl-1,3-dioxane was prepared by adding chlorine at the rate of 15 grams per hour to a mixture of 80 grams of 2-chloro-4-phenyl-2-methyl-1,3-diox-4-in and 100 cc. of carbon tetrachloride at 35° to 40° C. until the theoretical quantity of chlorine was absorbed. The reaction product was distilled under reduced pressure. 4,5,5-trichloro-4-phenyl-2-methyl-1,3-dioxane is a light yellow colored liquid which boils at 145° C. at 5 mm. Hg and has a specific gravity of 1.317 (20°/20° C.).

I claim:

1. The method of producing a compound having the formula:

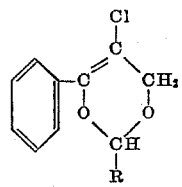

wherein R is a member selected from the class consisting of hydrogen and alkyl radicals containing from 1 to 4 carbon atoms, which comprises heating at a temperature of from about 50 to 150° C. a compound having the formula:

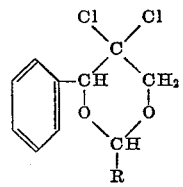

wherein R is a member selected from the class consisting of hydrogen and alkyl radicals containing from 1 to 4 carbon atoms, with an alkali metal hydroxide.

2. The method of producing a compound having the formula:

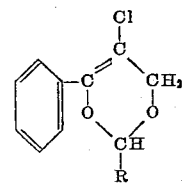

wherein R is a member selected from the class consisting of hydrogen and alkyl radicals containing from 1 to 4 carbon atoms, which comprises heating at a temperature of from about 50 to 150° C. a compound having the formula:

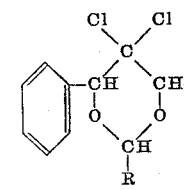

wherein R is a member selected from the class consisting of hydrogen and alkyl radicals containing from 1 to 4 carbon atoms, with an alkali metal hydroxide in the presence of an alcoholic solvent.

3. The method of producing a compound having the formula:

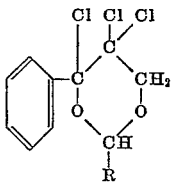

wherein R is a member selected from the class consisting of hydrogen and alkyl radicals containing from 1 to 4 carbon atoms, which comprises heating at a room temperature of from about 30° C. to 70° C. a compound having the formula:

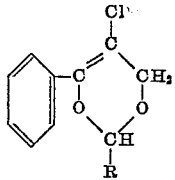

wherein R is a member selected from the class consisting of hydrogen and alkyl radicals containing from 1 to 4 carbon atoms with chlorine.

References Cited in the file of this patent

UNITED STATES PATENTS

| | | | |
|---|---|---|---|
| 2,296,375 | Arundale | Sept. 22, | 1942 |
| 2,414,989 | Umhoefer | Jan. 28, | 1947 |
| 2,445,733 | Radcliffe | July 20, | 1948 |
| 2,756,240 | Astle | July 24, | 1956 |

FOREIGN PATENTS

| | | | |
|---|---|---|---|
| 174,908 | Austria | May 26, | 1953 |
| 511,103 | Belgium | May 15, | 1952 |
| 489,878 | Canada | Jan. 20, | 1953 |
| 876,218 | France | Oct. 30, | 1942 |
| 870,857 | Germany | Mar. 16, | 1953 |

UNITED STATES PATENT OFFICE

CERTIFICATE OF CORRECTION

Patent No. 2816,898                                              December 17, 1957

Joseph A. Lambrech

It is hereby certified that error appears in the printed specification of the above numbered patent requiring correction and that the said Letters Patent shoud read as corrected below.

Column 5, lines 17 and 18, before "temperature" strike out -- room --.

Signed and sealed this 11th day of February 1958.

(SEAL)
Attest:
KARL H. AXLINE
Attesting Officer

ROBERT C. WATSON
                                                                      Commissioner of Patents